United States Patent
Srinivasan et al.

(10) Patent No.: US 10,970,305 B2
(45) Date of Patent: Apr. 6, 2021

(54) METHODS AND SYSTEMS OF DATABASE CLUSTER FORMATION AND MANAGEMENT

(71) Applicants: Venkatachary Srinivasan, Sunnyvale, CA (US); Sunil Sayyaparaju, Bangalore (IN); Ashish Shinde, Bangalore (IN)

(72) Inventors: Venkatachary Srinivasan, Sunnyvale, CA (US); Sunil Sayyaparaju, Bangalore (IN); Ashish Shinde, Bangalore (IN)

( * ) Notice: Subject to any disclaimer, the term of this patent is extended or adjusted under 35 U.S.C. 154(b) by 284 days.

(21) Appl. No.: 15/712,124

(22) Filed: Sep. 21, 2017

(65) Prior Publication Data

US 2018/0276251 A1 Sep. 27, 2018

Related U.S. Application Data

(60) Provisional application No. 62/397,511, filed on Sep. 21, 2016.

(51) Int. Cl.
*G06F 16/00* (2019.01)
*G06F 16/27* (2019.01)
*G06F 16/21* (2019.01)

(52) U.S. Cl.
CPC .............. *G06F 16/27* (2019.01); *G06F 16/21* (2019.01)

(58) Field of Classification Search
None
See application file for complete search history.

(56) References Cited

U.S. PATENT DOCUMENTS

| 9,201,742 B2* | 12/2015 | Bulkowski | G06F 11/183 |
| 2016/0179642 A1* | 6/2016 | Cai | G06F 11/2033 714/4.12 |
| 2017/0017680 A1* | 1/2017 | Jaakola | G06F 16/2379 |

* cited by examiner

*Primary Examiner* — Debbie M Le

(57) ABSTRACT

A computerized method useful for node cluster formation and management in a distributed database system includes the step of providing a set of database nodes in a database cluster. Each node of the set of database nodes comprises a cluster management module, a heartbeat module, and a globally unique node identifier. The cluster management module manages cluster membership by maintaining a succession list. The succession list comprises a list of all current members in the database cluster. The heartbeat module communicates a pulse message to every other node in the set of database nodes. The method includes the step of maintaining, with each heartbeat module of each database node, an adjacency list.

7 Claims, 18 Drawing Sheets

METHODS AND SYSTEMS OF DATABASE CLUSTER FORMATION AND MANAGEMENT

CROSS-REFERENCE TO RELATED APPLICATION

This application claims priority to U.S. Provisional Application No. 62/397,511, titled METHODS AND SYSTEMS OF DATABASE CLUSTER FORMATION AND MANAGEMENT filed on 21 Sep. 2016. This provisional application is incorporated by reference in its entirety.

BACKGROUND

1. Field

This application relates database management and more specifically to a system, article of manufacture and method for database cluster formation and management.

2. Related Art

In a distributed database system, the nodes in a cluster can be set to agree on the cluster members. Over time nodes may fail (e.g. network connections may fail or new nodes may be added to increase the overall capacity of the cluster). Network failures make the problem difficult where in the cluster may be partitioned into two or more partitions, accordingly, improvements to monitoring cluster changes and arriving at consensus on cluster membership after such a change can improve cluster formation and management.

BRIEF SUMMARY OF THE INVENTION

In one aspect, a computerized method useful for node cluster formation and management in a distributed database system includes the step of providing a set of database nodes in a database cluster. Each node of the set of database nodes comprises a cluster management module, a heartbeat module, and a globally unique node identifier. The cluster management module manages cluster membership by maintaining a succession list. The succession list comprises a list of all current members in the database cluster. The heartbeat module communicates a pulse message to every other node in the set of database nodes. The method includes the step of maintaining, with each heartbeat module of each database node, an adjacency list. The adjacency list comprises a list of database nodes from which the database note has received. The method includes the step of determining a principal node of the database cluster selecting the database node with a unique node identifier that is the largest amongst the database node's adjacency list. The method includes the step of, with the principal node, monitoring a principal node's adjacency lists. The method includes the step of determining an unhealthy node of the set of database nodes in a database cluster. The method includes the step of evicting the unhealthy node from the database cluster. The method includes the step of identifying each cluster transition within the database cluster with a uniquely generated cluster key.

Figure 1:
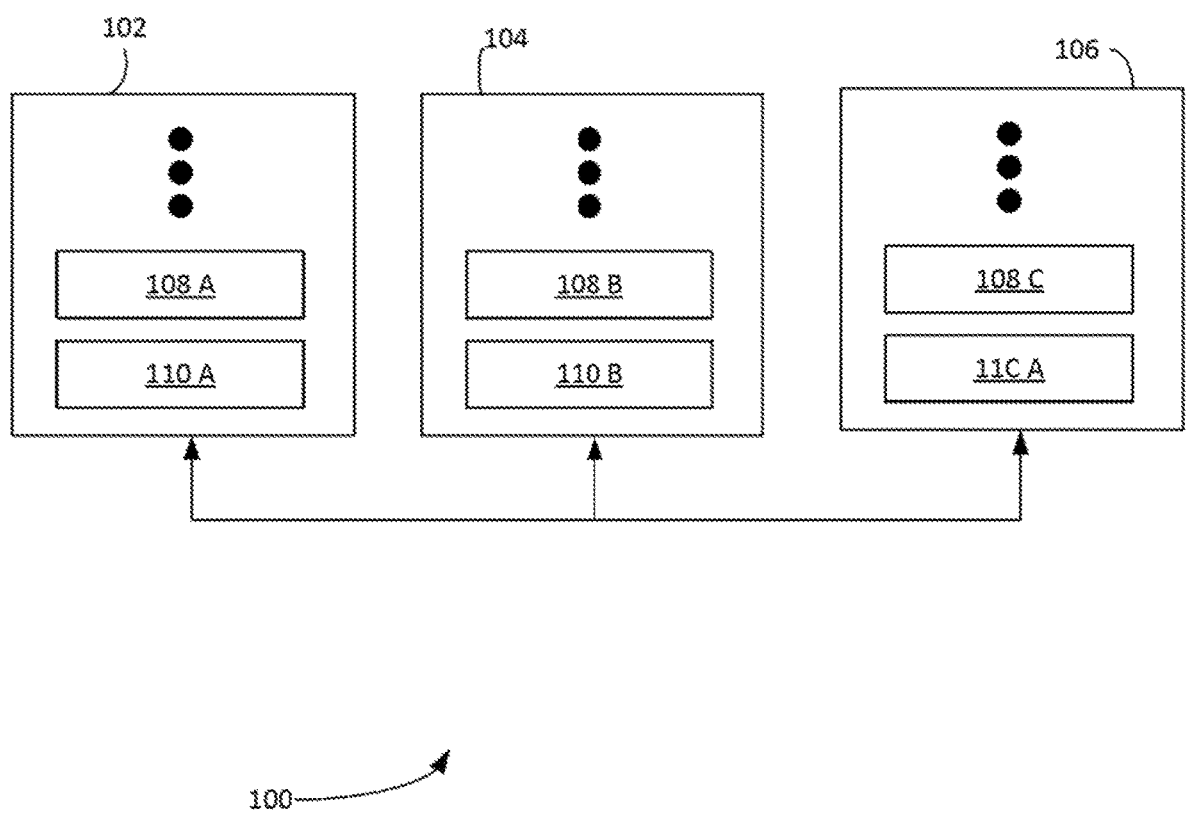
FIG. 1 illustrates an example node cluster in a distributed database system, according to some embodiments.

The Figures described above are a representative set, and are not an exhaustive with respect to embodying the invention.

DESCRIPTION

Disclosed are a system, method, and article of manufacture for methods and systems of database cluster formation and management. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Clique can be a node-cluster state where every node in the node cluster is present in the adjacency list of every other node in the node cluster.

Heartbeat can be a periodic signal generated by hardware or software to indicate normal operation or to synchronize other parts of a system.

Paxos can be a family of protocols for solving consensus in a network of unreliable entities. Consensus can be the process of agreeing on one result among a group, of participants. Paxos is an example of a consensus algorithm.

Principal can be a node which is part of a cluster and has highest node-id among all the nodes of the cluster. For example, given a cluster membership, this can be any principal selection can be any deterministic procedure on the node-ids. Cluster change decisions are taken by the principal node.

Non-Principal can be a node which is part of the cluster and is not the principal for that cluster. Steady state can mean that cluster nodes in a database network are no longer in flux.

Orphan can be node which is not part any cluster (e.g. not even a single node cluster).

EXAMPLE SYSTEM

FIG. 1 illustrates an example node cluster 100 in a distributed database system (e.g. a flash-optimized in-memory NoSQL database etc.), according to some embodiments. Node cluster 100 can include nodes 102-106. Nodes 102-106 can include various components, inter alia: cluster management modules 108 A-C and heartbeat modules 110 A-C. Heartbeat modules 110 A-C can send pulse messages to every other node in the cluster Cluster management modules 108 A-C can handle cluster membership. For example, a node 'n1' can detect that another node 'n2' has failed when 'n1' does not receive any heartbeats from 'n2' for a timeout period. The failure could be either a failure of 'n2' or the failure of a computer network link between 'n1' and 'n2'.

Nodes 102-106 can be assigned a globally unique node identifier. Each heartbeat module (e.g. a member of heartbeat modules 110 A-C) can maintain a list of nodes from which it is receiving heartbeats at a specified period and steady rate (e.g. can include network connectivity, etc.). This list is called an adjacency list. Cluster management modules 108 A-C can maintain a list of all current members in the cluster delineated as a succession list. A node considers itself a principal node when its node identifier is the largest amongst the node's adjacency list. Each cluster transition can also be identified by a uniquely generated cluster key.

Node cluster 100 can implement an algorithm wherein the principal node monitors the cluster for failures and/or new nodes joining. The principal node can propose a change to the succession list. The other nodes in node cluster 100 can vote for the change. Once a majority vote is reached the new succession list can be accepted and become the current succession list. In some embodiments, node cluster 100 can utilize a Consensus-based algorithm to reach the new succession.

Node cluster 100 can implement quantum batching of events. For example, Nodes 102-106 can divide time into periodic intervals, hereafter termed quantum intervals. A rule can be implemented that mandates that nodes 102-106 can make cluster change decisions at the start of quantum intervals. In this way, nodes 102-106 can be set to not react too quickly to various node arrival/departure events as detected by the heartbeat subsystem. Rather, nodes 102-106 can batch various cluster management events (e.g. data migration, etc.) and process them in a single cluster change. In this way, nodes 102-106 can avoid going through multiple cluster changes and triggering unnecessary migrations. It is noted that nodes 102-106 are provided by way of example and that n-number of nodes can be utilized in other example embodiments.

Node cluster 100 can implement continuous monitoring processes. For example, each node can continuously monitor cluster health via information passed around in the heartbeats. In some examples, each heartbeat can also include, inter alia: current adjacency list, current cluster key, current succession list, etc.

Principal nodes can monitor their respective dependent nodes for changes in adjacency lists and evict unhealthy nodes. A node can be delineated as unhealthy if any one of the following is true, inter alia: the node is missing in at least one adjacency list from nodes in the cluster; the node's cluster key does not match current cluster key; etc. A non-principal node can monitor the principal node and declare them as orphans if the principal is deemed lost. A principal can be determined to be lost if: the principal node is missing in the non-principal node's adjacency list; the principal node's succession list does not include the respective non-principal node; etc.

Node cluster 100 can implement stringent membership. For example, principal nodes can approve/retain nodes in the cluster only if the entire cluster is a clique, where every node in the cluster is present in the adjacency list of every other node in the cluster.

Node cluster 100 can implement cluster membership by request. Cluster membership can be set by request from non-principal nodes to principal nodes. A node, which is part of a cluster, may not send a request to any other node for membership. This rule can ensure that a new set of nodes may not be able to break away a stable cluster.

Node cluster 100 can implement a consensus algorithm (e.g. a Paxos algorithm) for cluster consensus. In some examples, the principal nodes can propose new cluster membership in response to various events, such as: cluster join requests, node evictions and node departures. The principal node can manage the membership/succession list is through a Consensus algorithm. If the Paxos algorithm succeeds, the new succession list and cluster key are considered accepted and are used by all members of the new succession list.

The Consensus algorithm can resolve conflicts when more than one node considers itself to be a principal node (e.g. when a database network is partitioned). The Consensus algorithm can allow for a degree of fault tolerance against packet drops by using majority consensus.

Node cluster 100 can implement principal-node selection operations. For example, a principal node can be selected by convention to be the node with the highest-visible node identifier.

Figure 2:
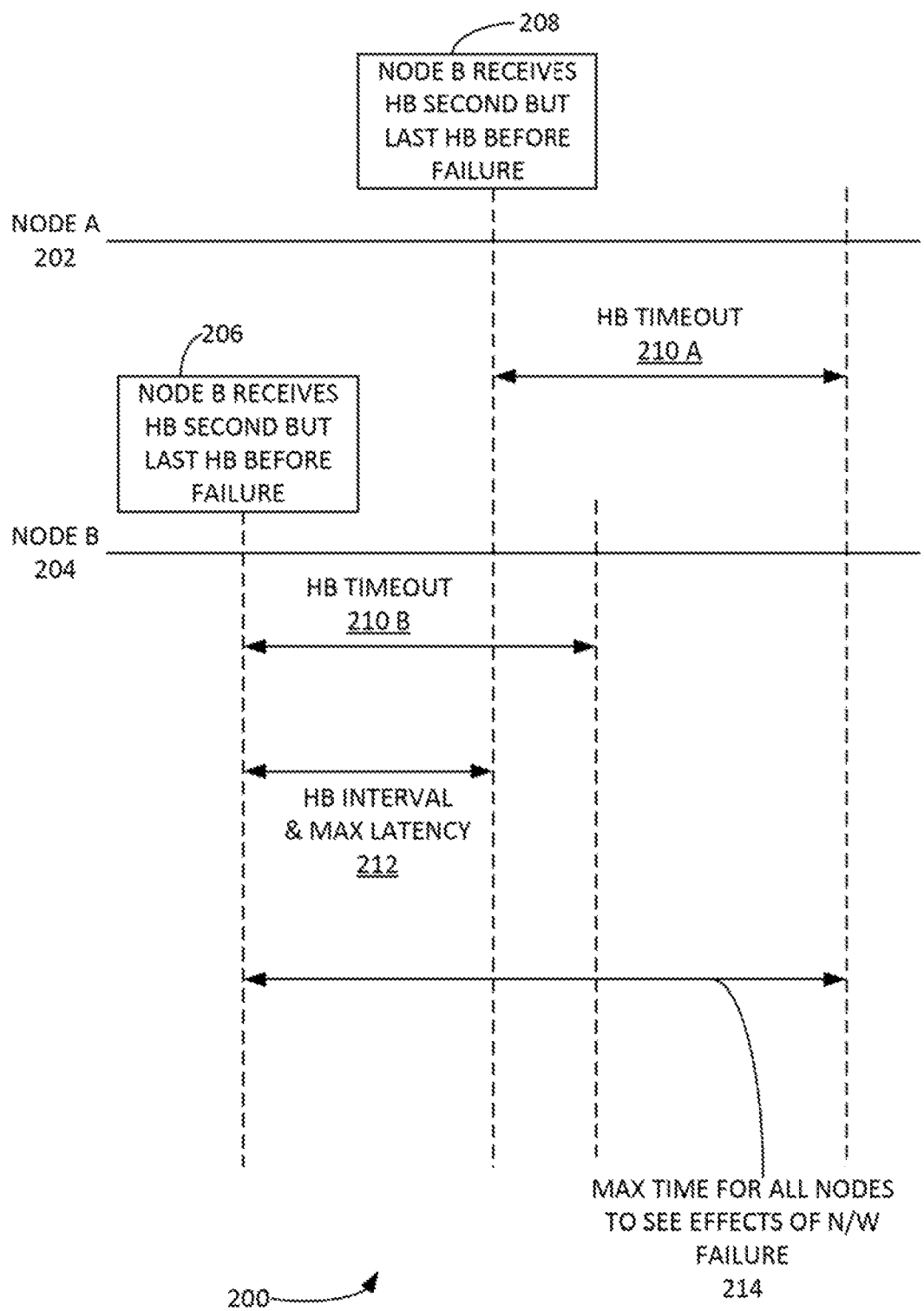
FIG. 2 illustrates an example process for luster management, according to some embodiments.

FIG. 2 illustrates an example process 200 for cluster management, according to some embodiments. In step 202, process 200 can monitor a database cluster for failures. In step 204, process 200 can detect and include new nodes into the database cluster. In step 206, process 200 implement a procedure for a single cluster to split and form smaller clusters on network failures and the merge back and reform a single cluster when the network heals.

Process 200 can minimize the number of cluster transitions that a database cluster may undergo after a steady-state has been reached. A set of network-partitioned nodes can be in a steady-state once the network connections are no longer in flux. In some embodiments, a running database system can be perturbed by a single network/node-set failure. It can then restore to normalcy after the issue(s) is resolved. It is noted that process 200 be made generic to include any number of faults as well with a single fault example.

Node cluster 100 can implement quantum-interval computation. Quantum-interval computation can determine the smallest interval possible in which a node can observe all events caused by a single-network failure, network healing, a set of nodes being added and/or removed and then convey its observations to all connected nodes.

Figure 3:
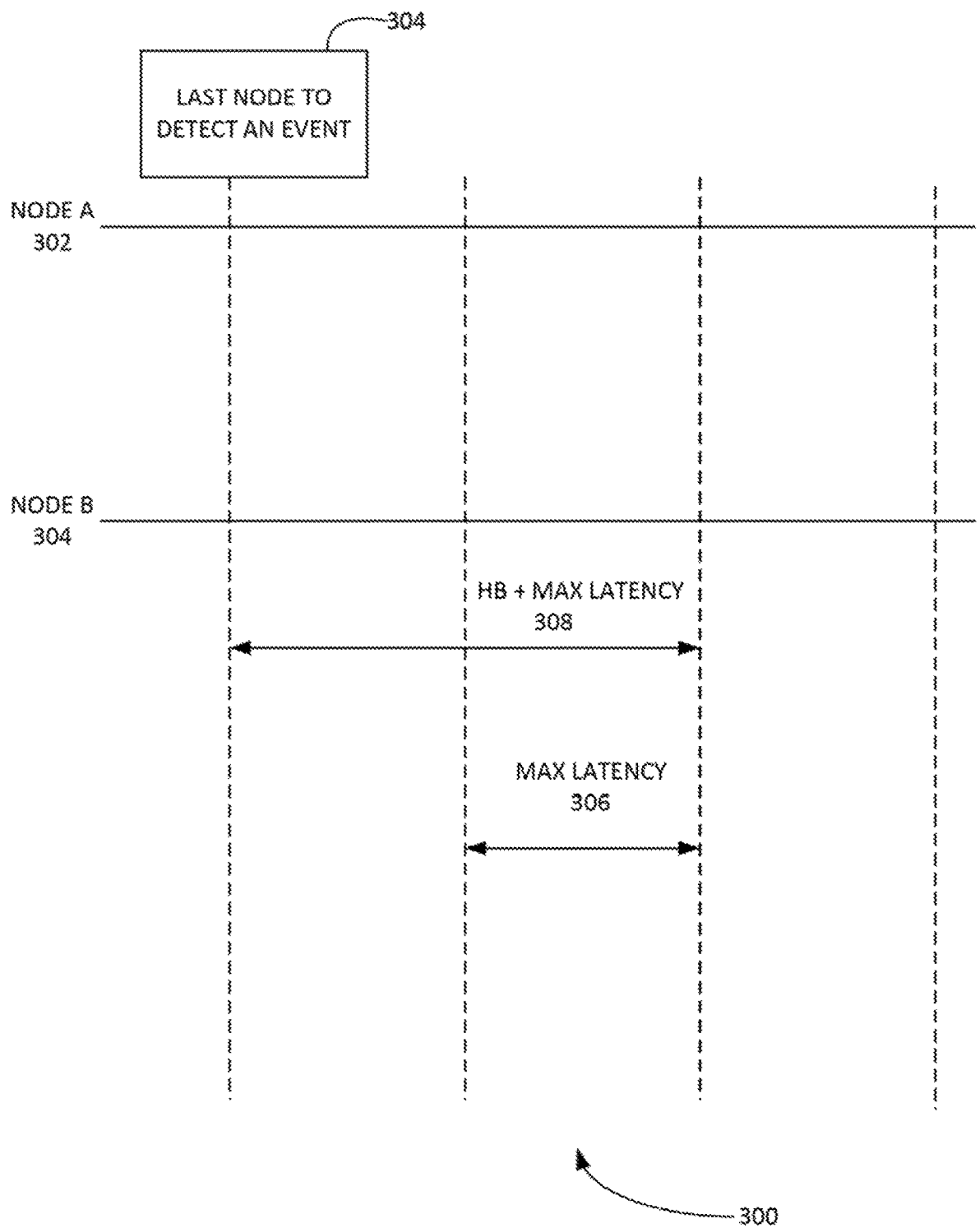
FIG. 3 illustrates an example context when database nodes are removed and/or a database network is partitioned, according to some embodiments.

FIG. 3 illustrates an example context 300 when database nodes (e.g. 'nodes') are removed and/or a database network is partitioned, according to some embodiments. In context 300, some set of nodes is no longer visible to node A 302 and node B 304. This can be either because of a network fault or due to a database shut down. It is noted that a node-departure difference maximum can be calculated as the sum of a heartbeat timeout, heartbeat interval and maximum latency in measurement 314.

For example, as shown in FIG. 3, node B 304 can receive a heartbeat second (e.g. after node A 302 receives that heartbeat) in step 306. This can be the last heartbeat received before failure. In step 308, node A 302 can receive the last heartbeat just before failure. Heartbeat timeouts 310 A-B can be implemented. Heartbeat interval and maximum latency can also be measured in measurement 312.

Figure 4:
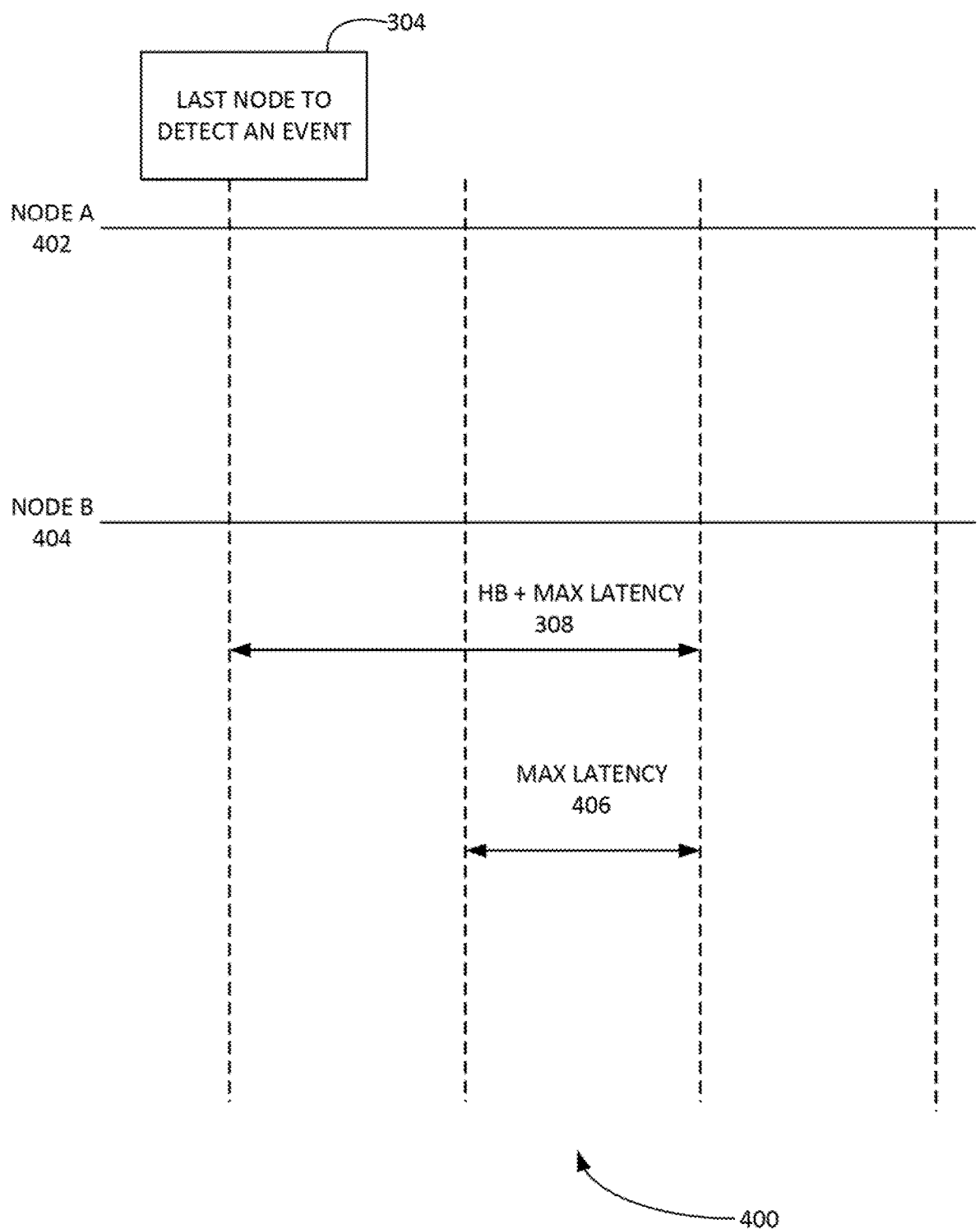
FIG. 4 illustrates an example context of when nodes are added and/or a database network is healed, according to some embodiments.

FIG. 4 illustrates an example context 400 of when nodes are added and/or a database network is healed, according to some embodiments. For example, when a new node(s) is added, the maximum time difference between node A 402 and node B 404 detecting the new node (or two nodes added at the same time) is calculated by the equation of step 308. More specifically, the node arrival difference maximum time equals the sum of the heartbeat interval and the maximum network latency 406. Equation 308 can be used to determine the maximum time a node or two nodes can have to see all the effects of when a set of nodes become unavailable (e.g. 'go down') or are partitioned by a database network failure. Equation 308 takes in to account the time for node A 402 and node B 404 to receive changes from all nodes. Context 400 illustrates the maximum time node A 402 and node B 404 may take to exchange node failure information with every node to which they are connected.

In one generalized example, node A 402 can the last node to observe an event. In one example, node A 402 can wait for a heartbeat interval to send this observation along to the other nodes as a part of its heartbeat message. The maximum time therefore for this node to communicate its observation is provided as a maximum communication time. The maximum communication time can be the sum of heartbeat interval and maximum latency (e.g. networking and/or processing latencies).

The quantum interval can be the maximum time a node takes to detect an event plus the maximum time it takes for a node to communicate that event. For example, Quantum interval=max(Node Arrival Difference Max, Node Departure Difference Max)+Maximum Communication time=Node Departure Difference Max+Maximum Communication Time=HB Timeout+HB interval+max latency+HB interval+max latency=HB Timeout+2*(HB interval+max latency).

In one example, the typical values for quantum interval can be (e.g. assuming typical LAN latencies of 1 ms to 5 ms) calculated as follows: Default Quantum interval=1.5 s+2*(0.15 s+[0.001 s to 0.005 s])=1.8 s. Assuming typical WAN latencies of 10 ms to 50 ms, then the Default Quantum interval=1.5 s+2*(0.15 s+[0.01 to 0.05 s])=1.82 s to 1.9 s. Assuming a very high one-way latency values of 100 ms to 500 ms, then the Default Quantum interval=1.5 s+2*(0.15 s+[0.1 s to 0.5 s])=2 s to 2.8 s. These equations and values are provided by way of example and not of limitation.

Figure 5:
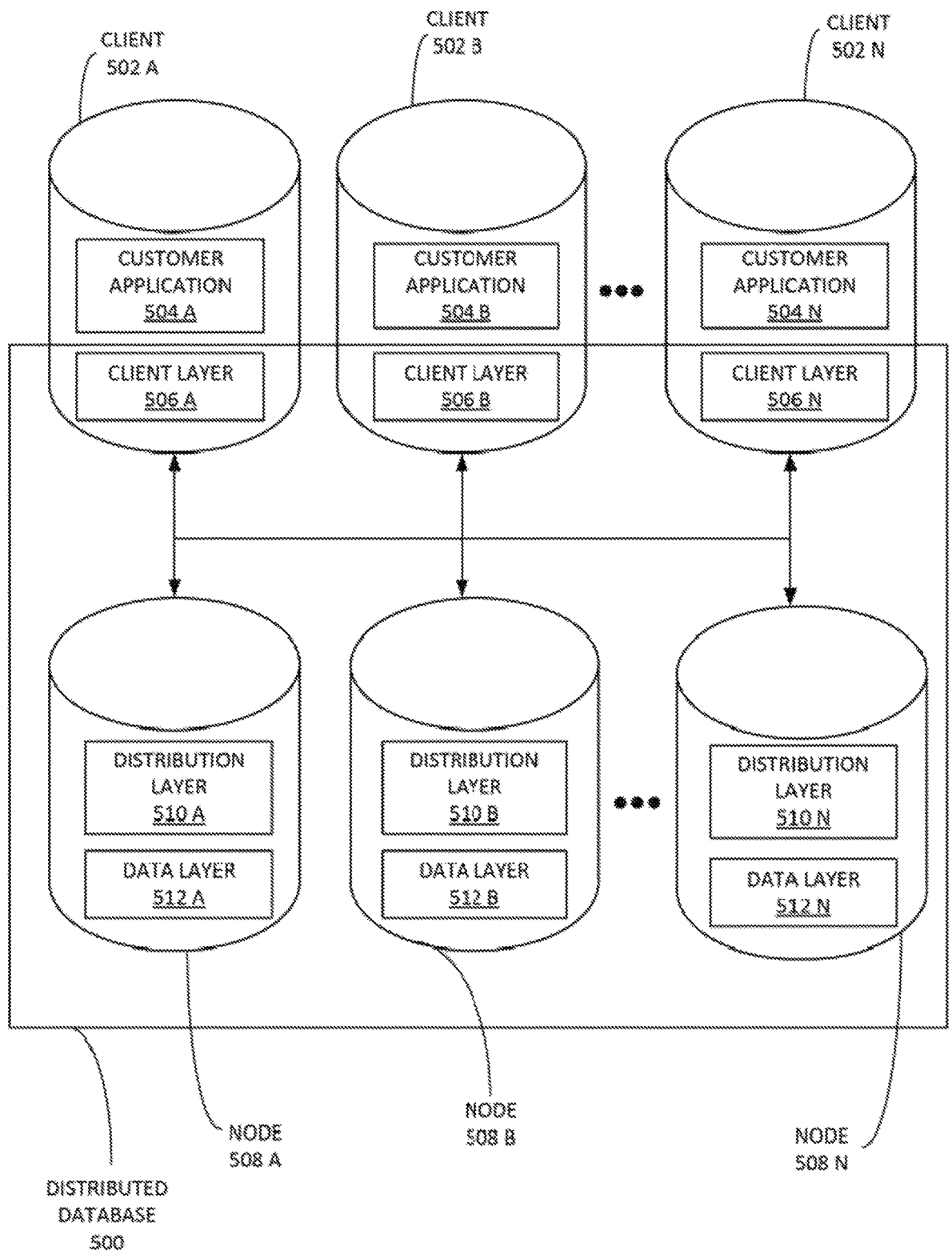
FIG. 5 shows, in a block diagram format, a distributed database system operating in a computer network according to an example embodiment.

FIG. 5 shows, in a block diagram format, a distributed database system (DDBS) 500 operating in a computer network according to an example embodiment. In some examples, DDBS 500 can be an Aerospike® database. DDBS 500 can typically be a collection of databases that can be stored at different computer network sites (e.g. a server node). Each database may involve different database management systems and different architectures that distribute the execution of transactions, DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non-transparent bridges, etc.). In some examples, some paths between entities can be implemented with Transmission Control Protocol (TCP), remote direct memory access (RDMA) and the like.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N.

Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally client layer 506 A-N can also track cluster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, Isolation, and Durability.

Atomicity. A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the cluster. On each server node, a data layer 512 A-N can manage stored, data on disk. Data layer 512 A-N can maintain indices corresponding to the data in the node. Furthermore, data layer 512 A-N be optimized for operational efficiency, for example, indices can be stored in a very tight format to reduce memory requirements, the system can be configured to use low level access to the physical storage media to further improve performance and the likes.

In some embodiments, cluster nodes 508 A-N can be an Aerospike Smart Cluster™, Cluster nodes 508 A-N can have a shared-nothing architecture (e.g. there is no single point of failure (SPOF)). Every node in the cluster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically).

Auto-discovery. Multiple independent paths can be used for nodes discovery—an explicit heartbeat message and/or via other kinds of traffic sent to each other using the internal cluster inter-connects. The discovery algorithms can avoid mistaken removal of nodes during temporary congestion. Failures along multiple independent paths can be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution. Once consensus is achieved and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication. The replication factor can be configurable. For example, a deployments use a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, the cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing. DDBS 500 and cluster nodes 508 A-N can be self-healing. If a node fails, requests can be set to automatically fail-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Consensus algorithm).

DDBS 500 can have a Shared-Nothing architecture: every node in an Aerospike cluster is identical, all nodes are peers and there is no single point of failure. Data is distributed evenly across nodes in a cluster using a Smart Partitions™ algorithm. To determine where a record should go, the record key (of any size) is hashed into a 20-byte fixed length string using RIPEMD160, and the first 1.2 bits form a partition ID which determines which of the partitions should contain this record. The partitions are distributed equally among the nodes in the cluster, so if there are N nodes in the cluster, each node stores approximately 1/N of the data. The data can be distributed evenly (and randomly) across the nodes. There are no hot spots or bottlenecks where one node handles significantly more requests than another node.

Figure 6:
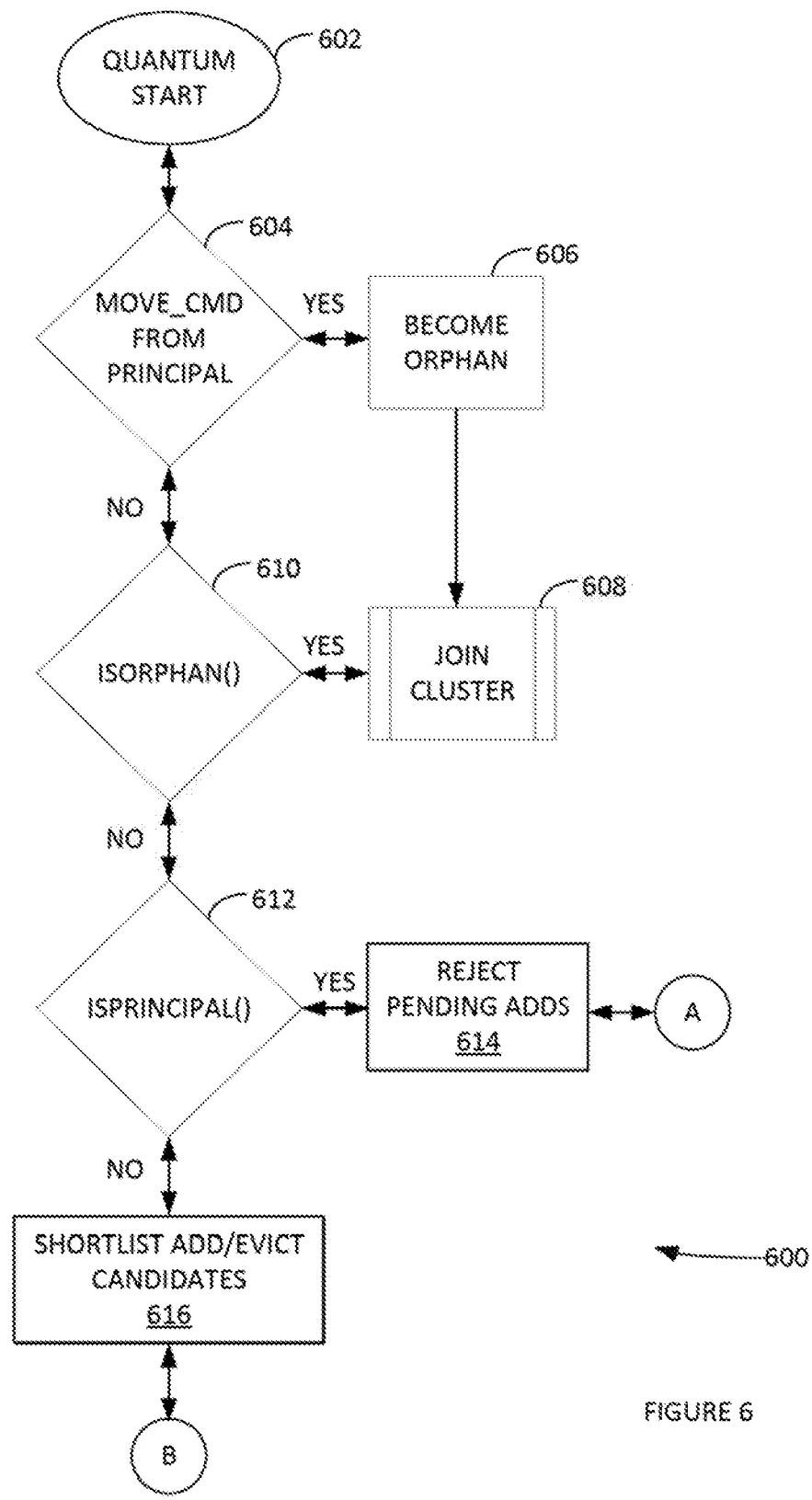
FIG. 6 illustrates an example quantum-start process database cluster node process flow, according to some embodiments.
Figure 7:
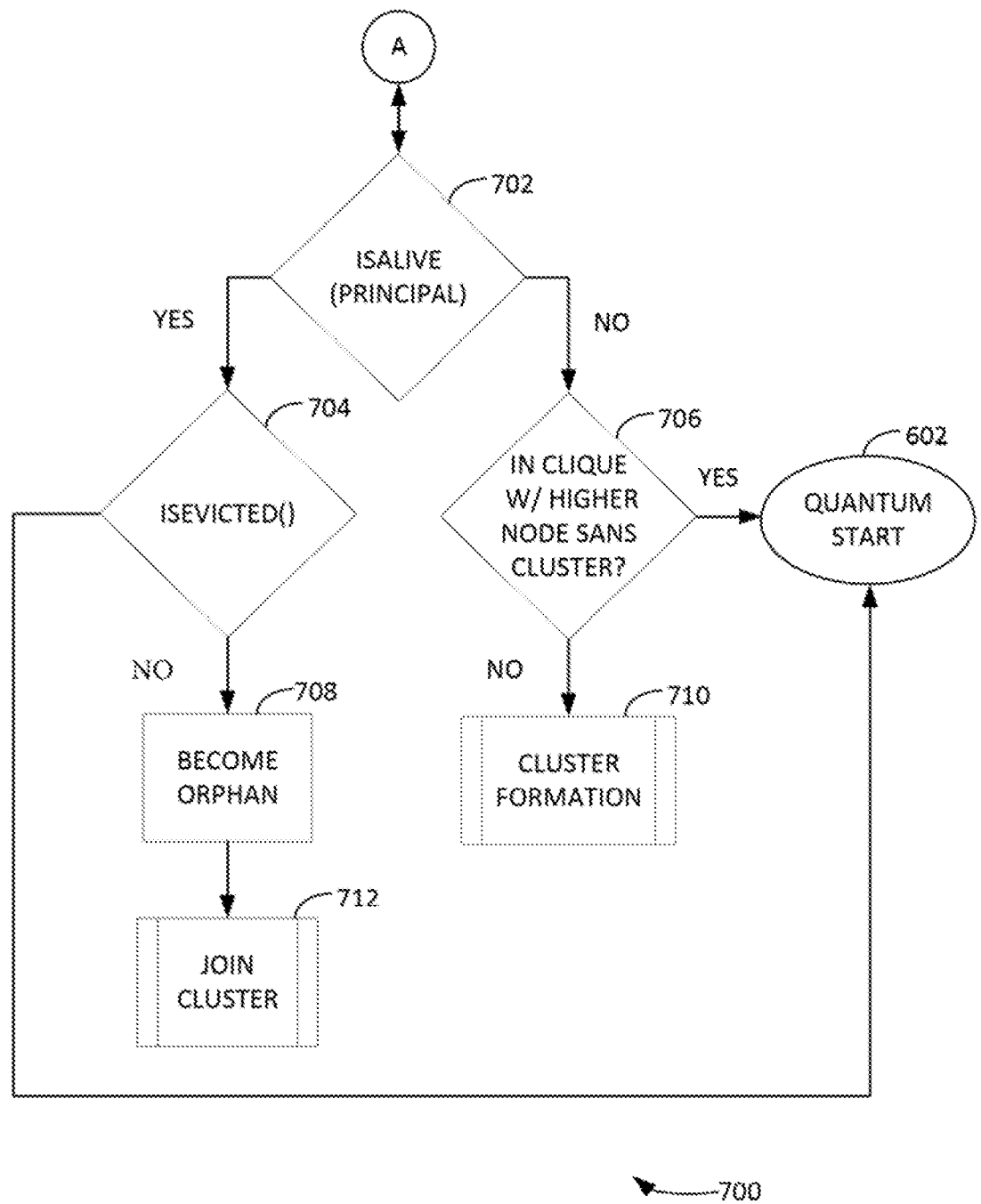
FIG. 7 illustrates a process of a database cluster node process flow, according to some embodiments.
Figure 8:
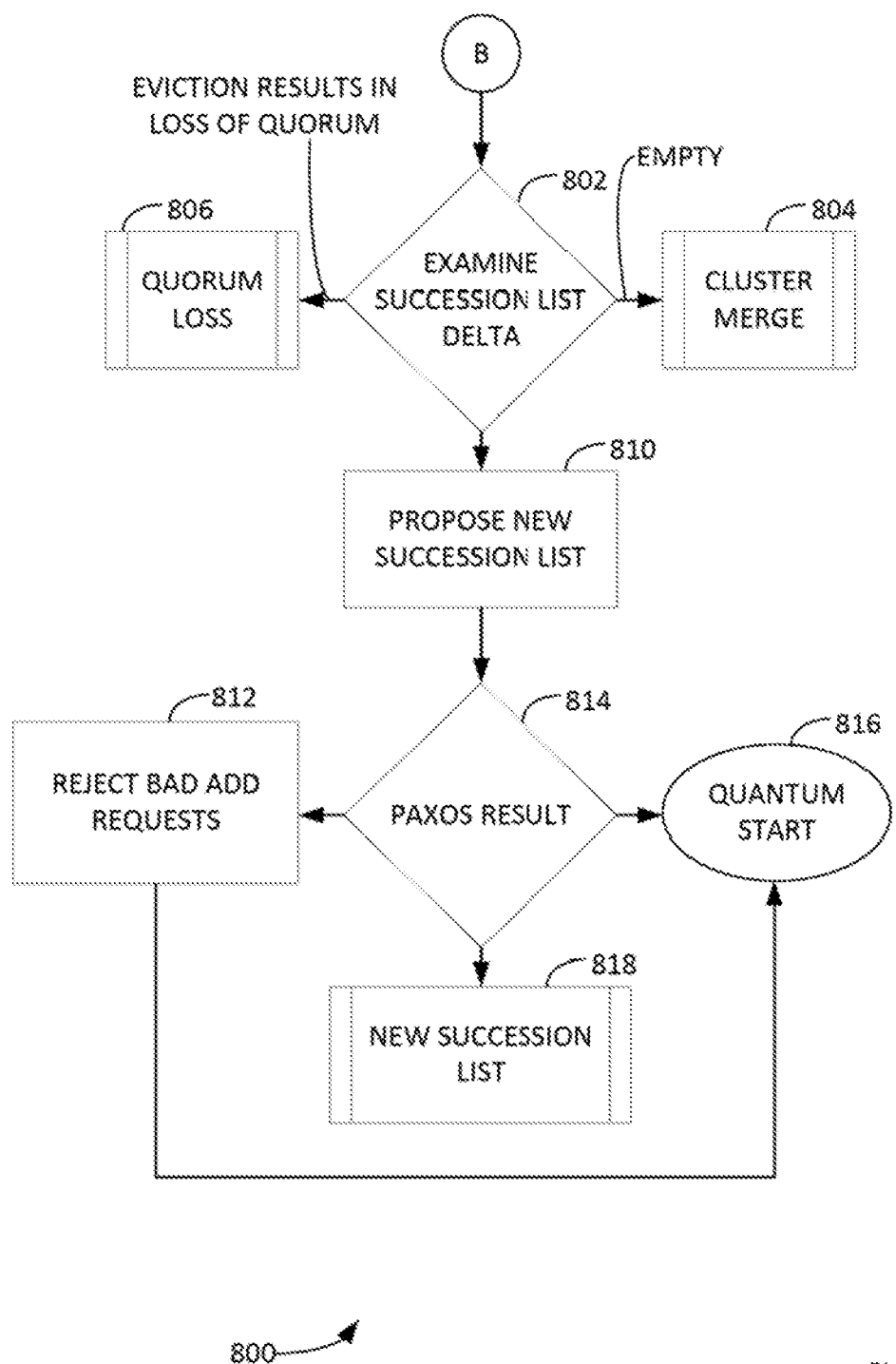
FIG. 8 illustrates process a database cluster node process flow, according to some embodiments.

FIGS. 6-8 illustrate example process 600-800 of a database cluster node process flow, according to some embodiments. It is noted the process 600-800 can be implemented in sequence based on the various context(s) of the node and/or cluster.

FIG. 6 illustrates an example quantum-start process 600 of a database cluster node process flow, according to some embodiments. In step 602, process 600 can implement a quantum start. In step 604, process 600 can determine if a move_cmd operation from a principal node is implemented. If 'yes', then, in step 606, process 600 can set the node as an orphan node. If 'no', then, in step 608, the node can then attempt to join the cluster. In step 610, process 600 can determine if the node is an orphan. If yes, then the node can then attempt to join the cluster in step 608. If 'no', then in step 612, process 600 can determine if the node is a principal node. If 'yes', then process 600 can reject pending add requests in step 614 and proceed to process 800 can be implemented. If 'no', then process 600 can shortlist add/evict candidates and process 700 can be implemented.

FIG. 7 illustrates a process 700 of a database cluster node process flow, according to some embodiments. In step 702, process 700 can determine if the principal node is alive. If 'yes' in step 702, then, in step 704, process 700 can be determined if the principal has been evicted. If 'yes' in step 704, then process 700 can implement a quantum start in step 602. If 'no' in step 704, then process 700 can the node can become an orphan in step 708. The node can then join a cluster in step 712. In 'no' in step 702, then, in step 706, process 700 can implement a quantum start in step 602. If 'yes' then process 700 can implement cluster formation in step 710.

FIG. 8 a process 800 of a database cluster node process flow, according to some embodiments. In step 802, process 800 can examine succession list delta, if eviction results in loss of quorum in step 802, process 800 can implement quorum. Process 800 can implement a loss procedure in step 806. If the succession list is empty, then process 800 can implement a cluster merge operation in step 804. in step 810, process 800 can propose new succession list, a Consensus algorithm can then be implement and a Consensus result obtained in step 814. Based on the Consensus result, process 800 can reject bad add requests in step 812 and then implement a quantum start procedure in step 816. alternatively, process 800 can new succession list in step 818.

Figure 9:
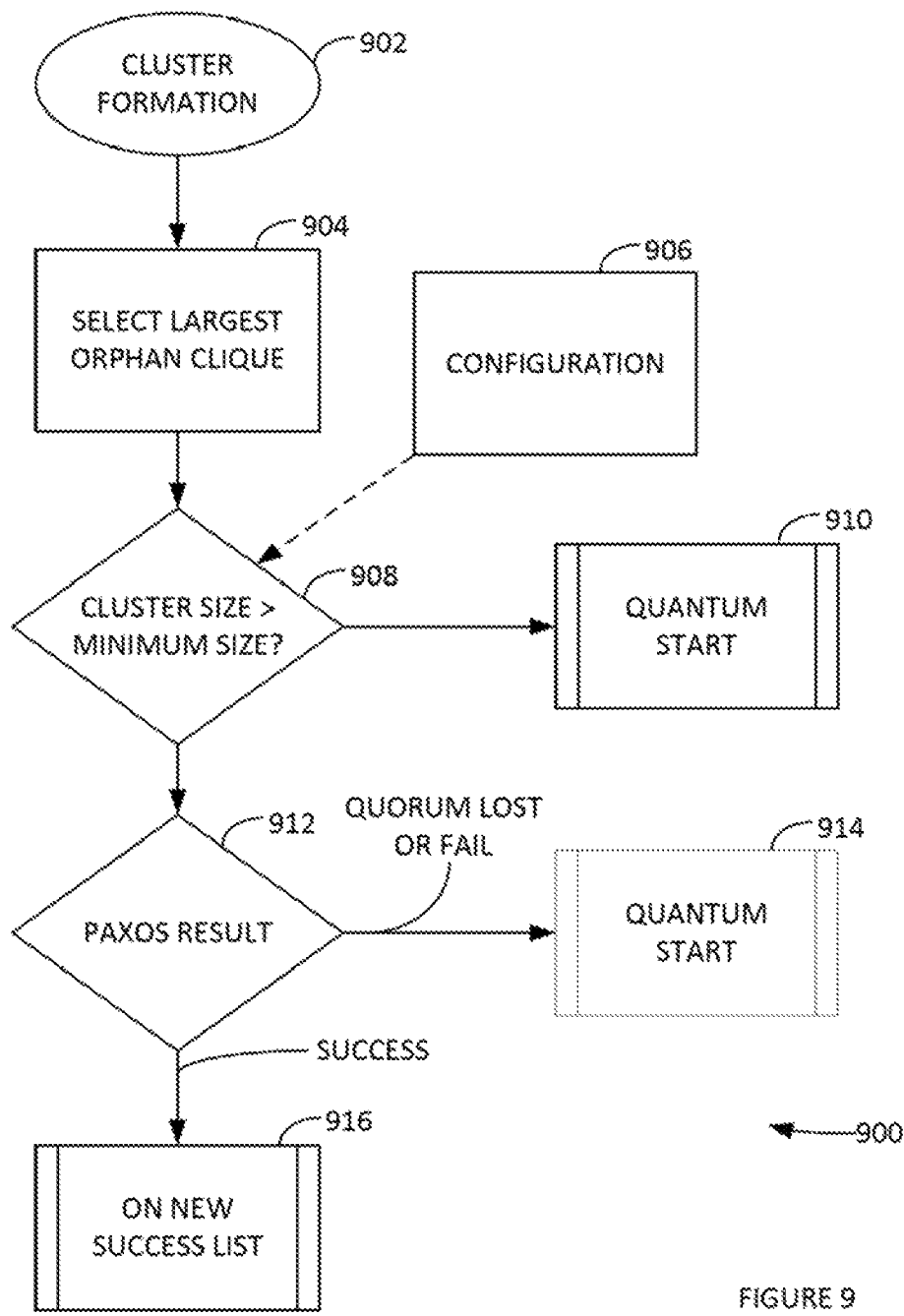
FIG. 9 illustrates an example database cluster formation process, according to some embodiments.

FIG. 9 illustrates an example database cluster formation process 900, according to some embodiments. In step 902, process 900 can begin the database cluster formation process. In step 904, process 900 can select the largest available/known orphan node clique. In step 906, various configuration information can be obtained/determined and provided to step 908. In step 908, process 900 can determine if the cluster size (e.g. the size of largest available/known orphan node clique, etc.) is greater than then the set minimum cluster size. If 'yes' in step 908, then in step 910, process 900 can implement a quantum start process (e.g. processes 600-800). If 'no' in step 908, then in step 912, process 900 can proceed to step 912. In step 912, process 900 can implement a Consensus selection algorithm and/or determine the result of a Consensus selection algorithm. If 'no' (e.g. a quorum us lost or fails to be made) in step 912, then in step 914, process 900 can implement a quantum start process (e.g. processes 600-800). If 'yes' (e.g. the Consensus election was successful) in step 912, there in step 916, process 900 can place the node(s) on a new succession list.

Figure 10:
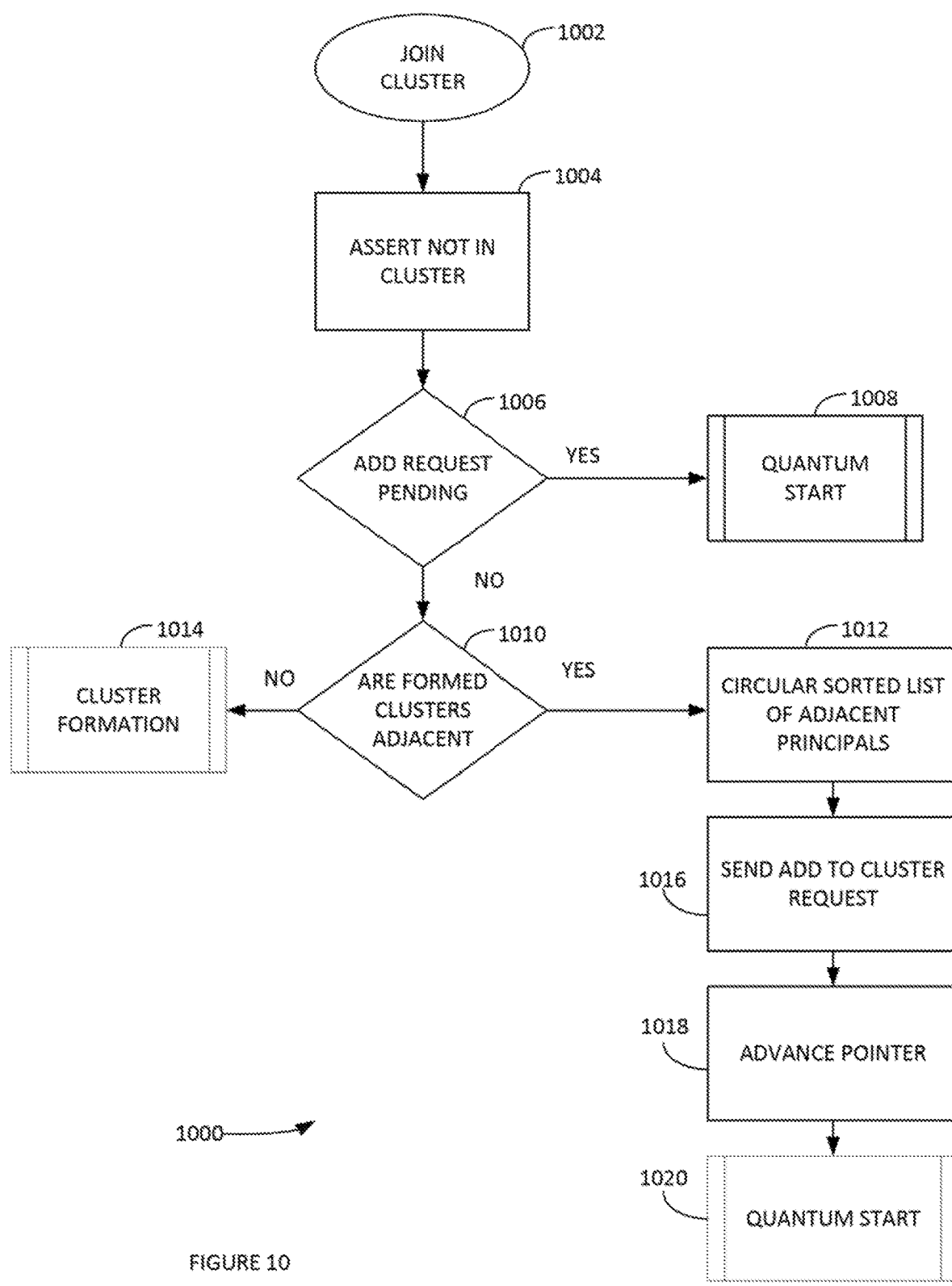
FIG. 10 illustrates an example process for a node to implement a join cluster operation, according to some embodiments.

FIG. 10 illustrates an example process 1000 for a node to implement a join cluster operation, according to some embodiments. It is noted that, as used herein, a 'database cluster' can be termed as a 'cluster'. In step 1002, process 1000 can initiate the join cluster operation. In step 1004, the node can assert that is it not in the cluster. In step 1006, it can be determined if an add request from the node is pending. If 'no', then process 1000 can implement step 1008. In 'yes', then process 1000 can implement step 1010. In step 1008, process 1000 can implement a quantum start process (e.g. processes 600-800). In step 1010, process 1000 can determine if formed clusters are adjacent. If 'no', then process 1000 can proceed to step 1014. If 'yes', then process 1000 can proceed to step 1012. In step 1014, process 1000 can implement a cluster formation process (e.g. process 900). In step 1012, process 1000 can implement a circular sorted list of adjacent principals. In step 1014, process 1000 can send en 'add to cluster' request. In step 1016, process 1000 can implement an advance pointer operation. In step 1018, process 1000 can implement quantum start process (e.g. processes 600-800).

Figure 11:
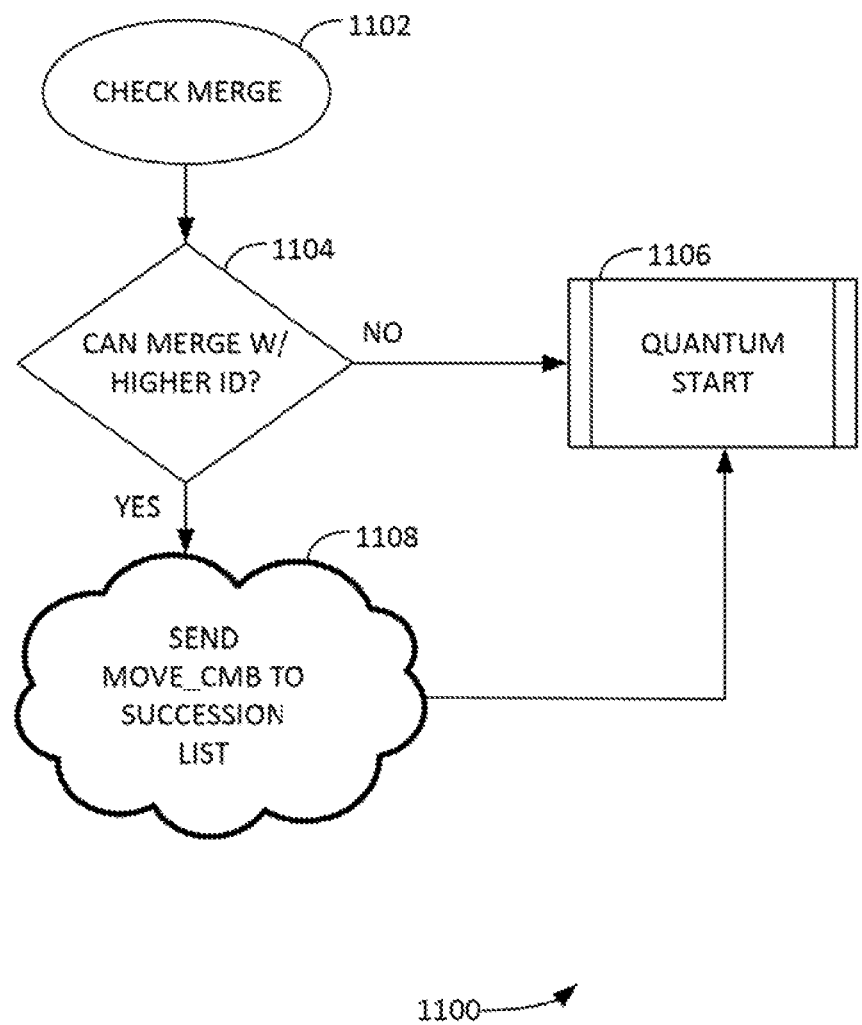
FIG. 11 illustrates an example process for checking a cluster-merge operation, according to some embodiments.

FIG. 11 illustrates an example process 1100 for checking a cluster-merge operation, according to some embodiments. In step 1102, process 1100 can initiate the cluster-merge operation. In step 1104, it can be determined if the node/cluster can merge with a higher identifier. If 'no' then process 1100 can implement step 1106. In 'yes', then process 1100 can implement step 1108, in step 1106, process 1100 can send move_cmb to succession list and then proceed to 1108. In step 1108, process 1100 can implement quantum start process (e.g. processes 600-800).

Figure 12:
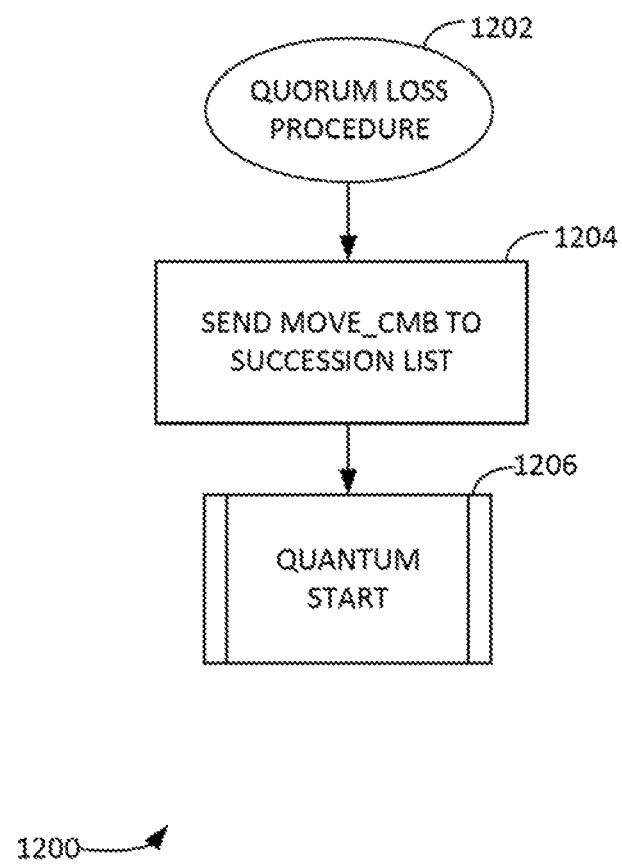
FIG. 12 illustrates an example process of a quorum loss procedure, according to some embodiments.

FIG. 12 illustrates en example, process 1200 of a quorum loss procedure, according to some embodiments. In step 1202, process 1200 can initiate the quorum loss procedure. In step 1204, process 1200 can send move_cmb to succession list and then proceed to 1108. In step 1206, process 1100 can implement quantum start process (e.g. processes 600-800).

Figure 13:
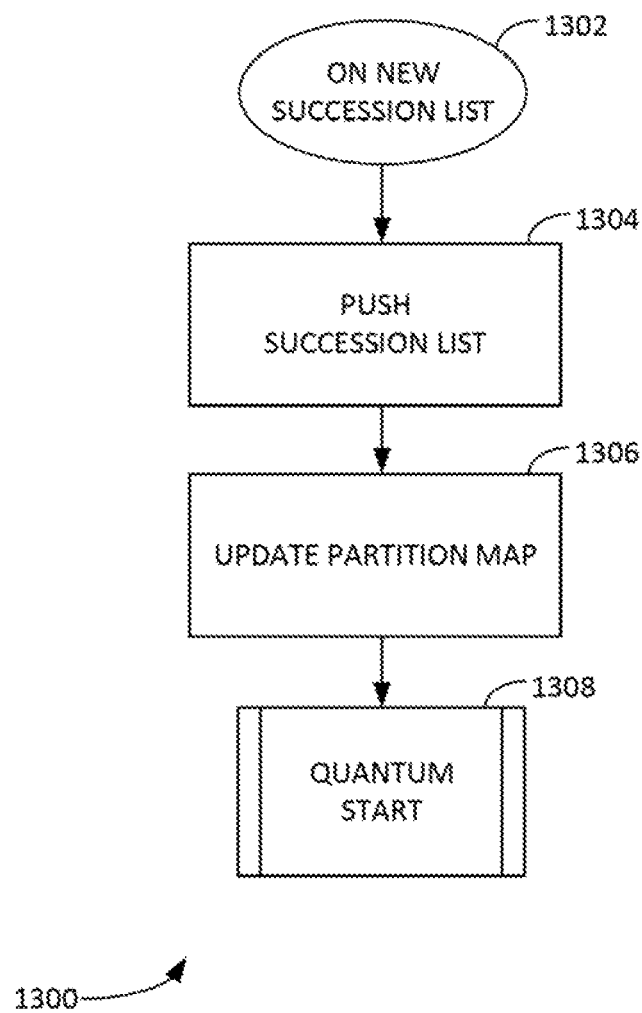
FIG. 13 illustrates an example process for placing a node on a succession list, according to some embodiments.

FIG. 13 illustrates an example process 1300 for placing a node on a succession list, according to some embodiments. In step 1302, process 1300 can initiate the placement a node on a succession list operation. In step 1304, can push the succession list. In step 1306, process 1300 can update the partition map. In step 1306, process 1300 can implement quantum start process (e.g. processes 600-800).

Figure 14:
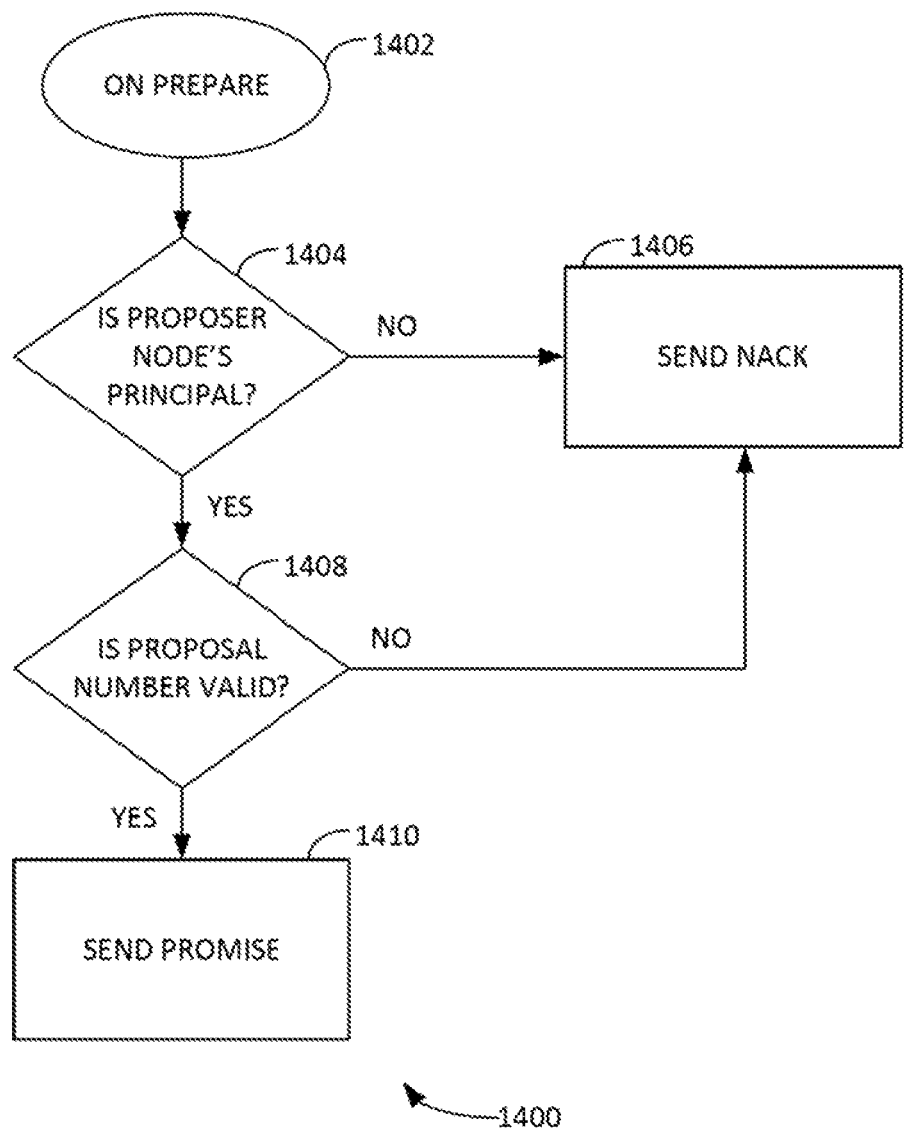
FIG. 14 illustrate an example process, according to some embodiments.

FIG. 14 illustrates an example process 1400, according to some embodiments. In step 1402, process 1400 can initiate an 'on prepare' operation. In step 1404, process 1400 can determine if the proposer node is a principal node. If 'no', the process 1400 proceeds to step 1406. If 'yes', then process 1400 proceeds to step 1408. In step 1406, process 1400 sends a negative-acknowledgement (e.g. a NACK) protocol message to the proposer node. In step 1408, process 1400 can determine if the proposal number is valid. If 'no', process 1400 can proceed to step 1406. If 'yes', process 1400 can proceed to step 1410. In step 1410, process 1400 can send a promise protocol message.

Figure 15:
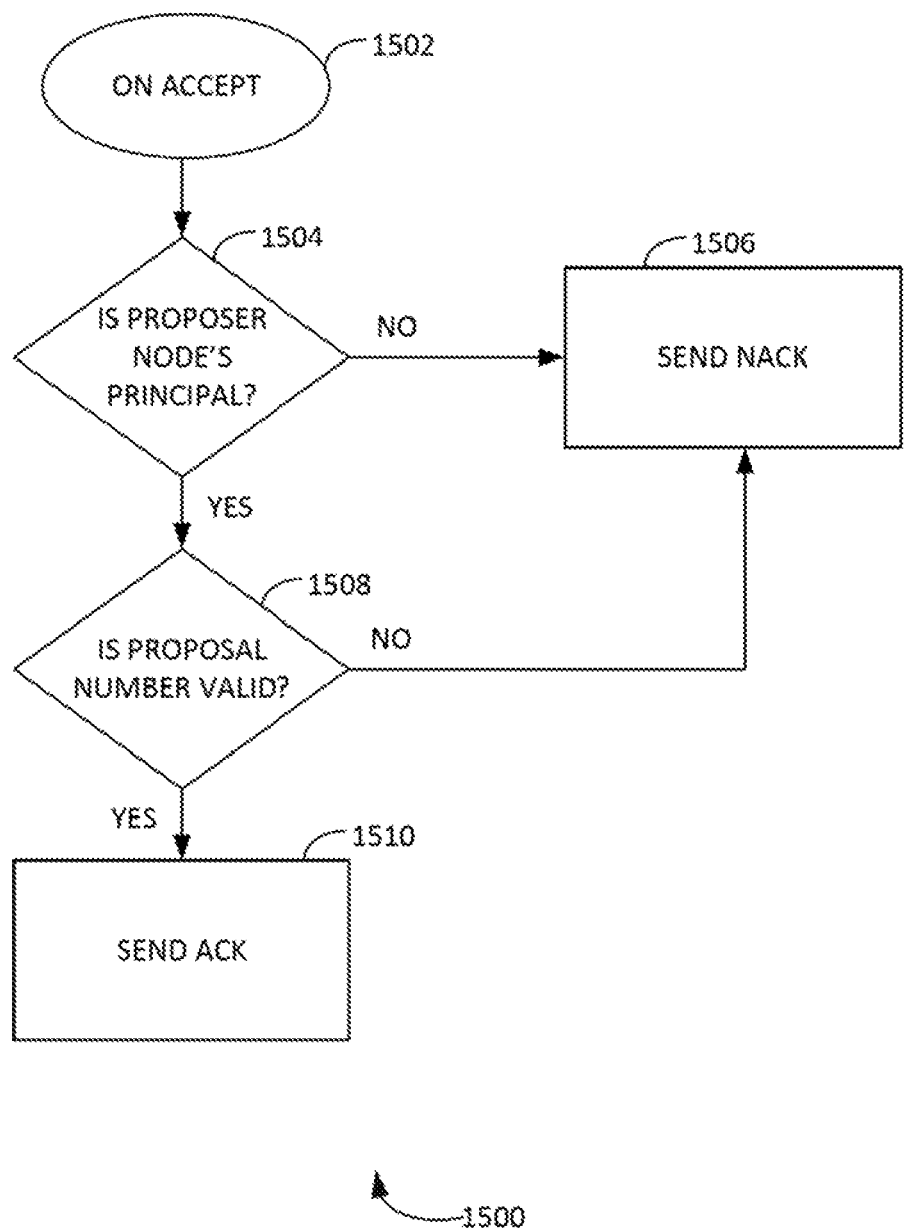
FIG. 15 illustrate an example process, according to some embodiments.

FIG. 15 illustrates an example process 1500, according to some embodiments. In step 1502, process 1500 can initiate an on accept operation. In step 1504, process 1500 can determine if the proposer node is a principal node. If 'no', the process 1500 proceeds to step 1506. If 'yes', then process 1500 proceeds to step 1508. In step 1506, process 1500 sends a negative-acknowledgement (e.g. a NACK) protocol message to the proposer node. In step 1508, process 1500 can determine if the proposal number is valid. If 'no', process 1500 can proceed to step 1506. If 'yes', process 1500 can proceed to step 1510. In step 1510, process 1400 can send a positive-acknowledgement (e.g. an ACK) protocol message to the proposer node.

Figure 16:
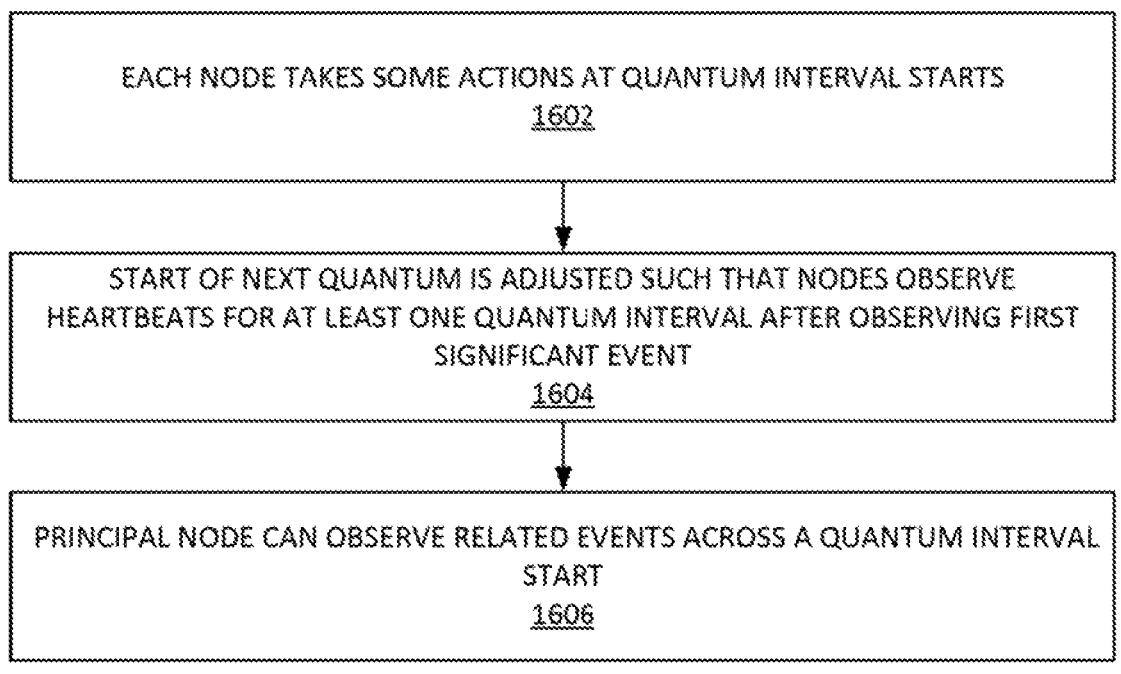
FIG. 16 illustrates an example process a quantum interval start, according to some embodiments.

FIG. 16 illustrates an example process 600 for a quantum interval start, according to some embodiments. In step 1602, each node takes some actions at quantum interval starts. In step 1604, the start of the next quantum is adjusted such that the node observes heartbeats for at least one quantum interval after observing the first significant event. Consequently, various events caused by the same root cause are observed before the next quantum start. In step 1606, if this is not ensured, a principal node can observe related events across a quantum interval start. The principal node can then go through two cluster transitions instead of a single cluster transition to respond to the events.

A significant event can include, inter olio: adjacency list change, a node add or node depart; a new principal is observed; a new cluster join request; etc. In one example, let Previous first quantum event=min(first adjacency list change time in last quantum, first principal list change time in last quantum, first join request in last quantum). Then the next quantum interval start time can be determined as: Next Quantum Interval Start time=max(Current quantum start time, Previous first quantum event)+Quantum Interval. These are provided by way of example and of limitation.

Figure 17:
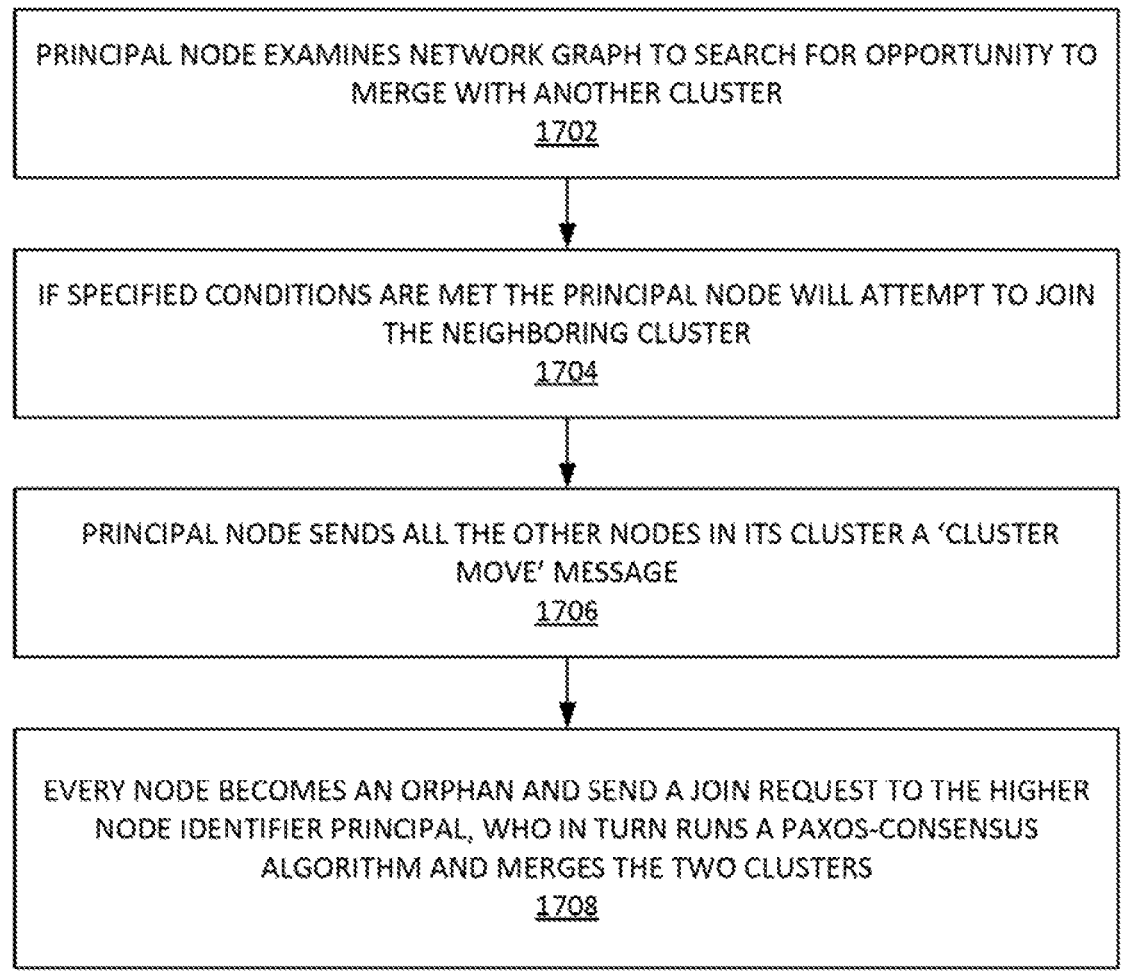
FIG. 17 illustrates an example process for database cluster merging, according to some embodiments.

FIG. 17 illustrates an example process 1700 for database cluster merging, according to some embodiments. In step 1702, a principal node can examine the network graph to search for an opportunity to merge with another cluster if its cluster is stable at the start of its quantum interval. In step 1704, If the following specified conditions are met the principal node can attempt to join the neighboring cluster:

1. Its cluster is stable and there are no join/evictions,
2. There is a principal with a higher node identifier adjacent to it, and
3. The union of this cluster's nodes and the principal cluster's nodes form a clique.

In step 1706, cluster merge can be achieved is by the principal node sending all the other nodes in its cluster a 'Cluster Move' message with a hint to move to the higher node identifier principal. In step 1708, upon receiving a move message every node becomes an orphan and sends a join request to the higher node identifier principal, who in turn run a Paxos and/or other consensus algorithm and merge the two clusters.

It is noted that the new proposal does not require the nodes to have their clocks synchronized. The nodes do require coordinated effort to ensure smaller number of cluster state transitions when clusters merge/form. The coordination can be indirectly achieved by the way nodes compute quantum interval starts. For example, in the case of a merge operation, the first join request from the cluster with a source principal pushing the destination principal's quantum interval forward. For example, all the join requests can arrive in the same quantum interval on the destination principal and can be incorporated in the same cluster change.

Figure 18:
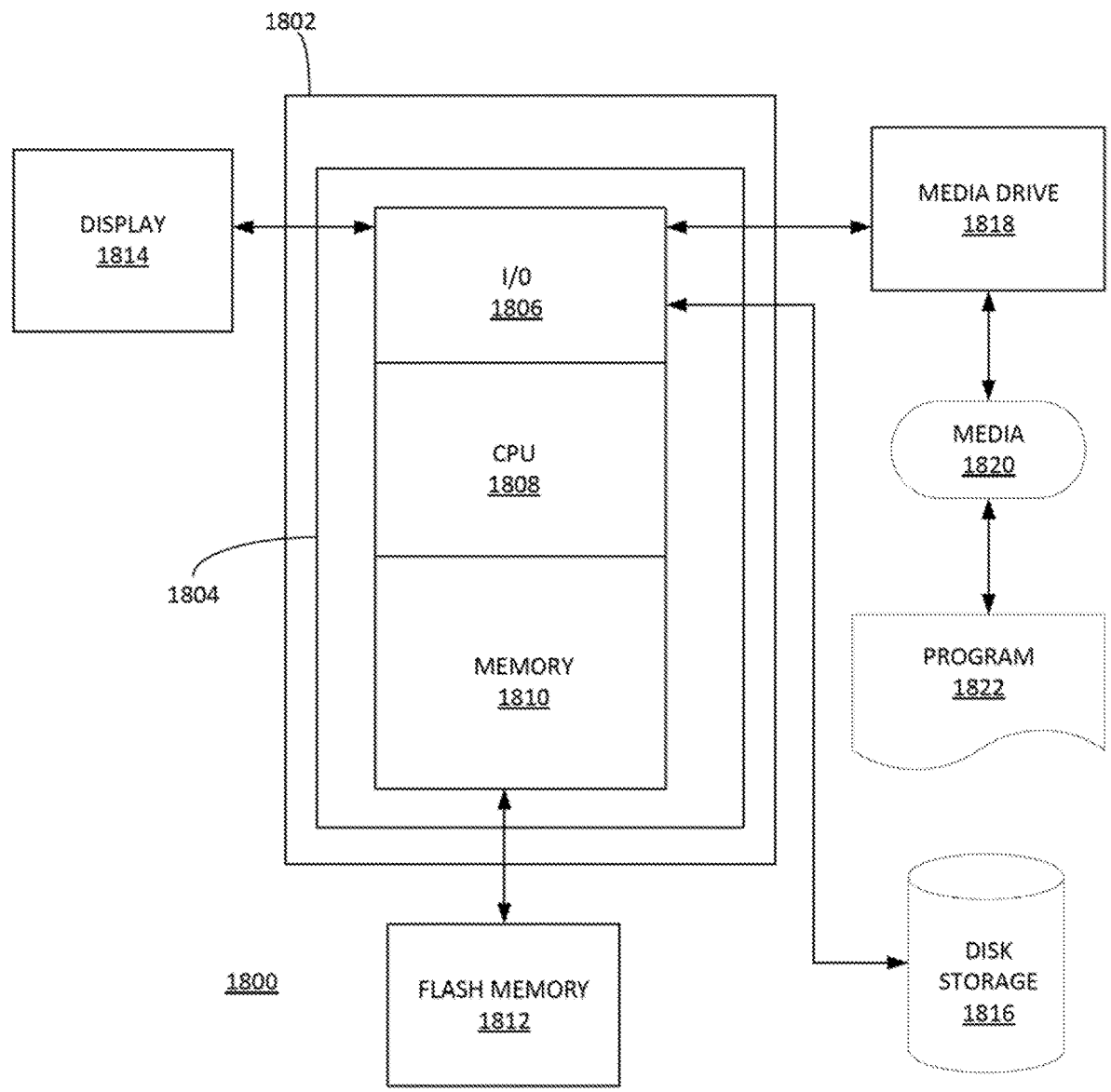
FIG. 18 is a block diagram of a sample-computing environment that can be utilized to implement various embodiments.

FIG. 18 depicts an exemplary computing system 1800 that can be configured to perform any one of the processes provided herein. In this context, computing system 1800 may include, for example, a processor, memory, storage, and I/O devices (e.g., monitor, keyboard, disk drive, Internet connection, etc.). However, computing system 1800 may include circuitry or other specialized hardware for carrying out some or all aspects of the processes. In some operational settings, computing system 1800 may be configured as a system that includes one or more units, each of which is configured to carry out some aspects of the processes either in software, hardware, or some combination thereof.

FIG. 18 depicts computing system 1800 with a number of components that may be used to perform any of the processes described herein. The main system 1802 includes a motherboard 1804 having an I/O section 1806, one or more central processing units (CPU) 1808, and a memory section 1810, which may have a flash memory card 1812 related to it. The I/O section 1806 can be connected to a display 1814, a keyboard and/or other user input (not shown), a disk storage unit 1816, and a media drive unit 1818. The media drive unit 1818 can read/write a computer-readable medium 1820, which can contain programs 1822 and/or data. Computing system 1800 can include a web browser. Moreover, it is noted that computing system 1800 can be configured to include additional systems in order to fulfill various functionalities. Computing system 1800 can communicate with other computing devices based on various computer communication protocols such a Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method useful for node cluster formation and management in a distributed database system comprising:
   providing a set of database nodes in a database cluster, wherein each node of the set of database nodes comprises a cluster management module, a heartbeat module, and a globally unique node identifier:
      wherein the cluster management module manages cluster membership by maintaining a succession list, wherein the succession list comprises a list of all current members in the database cluster, and
      wherein the heartbeat module communicates a pulse message to every other node in the set of database nodes;
   maintaining, with each heartbeat module of each database node, an adjacency list, wherein the adjacency list comprises a list of database nodes from which the database node has received;
   determining a principal node of the database cluster selecting the database node with a unique node identifier that is the largest amongst the database node adjacency list; and
   with the principal node:
      monitoring a principal node's adjacency lists;

determining an unhealthy node of the set of database nodes in a database cluster;

evicting the unhealthy node from the database cluster; and identifying each cluster transition within the database cluster with a uniquely generated cluster key.

2. The computerized method of claim 1, wherein the distributed database system comprises a flash-based in-memory NoSQL, database.

3. The computerized method of claim 1, wherein the one or more pulse messages are communicated at a specified period and steady rate.

4. The computerized method of claim 1, wherein a database node is delineated as unhealthy when the database node is missing in at least one adjacency list in the set of node the database cluster.

5. The computerized method of claim 1, wherein a database node is delineated as unhealthy when the database node's cluster key does not match a current cluster key.

6. The computerized method of claim 1, wherein a non-principal node monitors the principal node and declare a set of non-principal nodes as orphans when it is detected that the principal is deemed lost.

7. The computerized method of claim 1, wherein the principal node is determined to be lost when the principal node is missing in the non-principal node's adjacency list or the principal node's succession list does not include the non-principal node.

\* \* \* \* \*